Patented Dec. 30, 1952

2,624,029

UNITED STATES PATENT OFFICE 2,624,029

DYNAMIC BRAKING CONTROL

Torsten O. Lillquist, La Grange Park, Ill., assignor to General Motors Corporation, Detroit, Mich., a corporation of Delaware Application May 6, 1950, Serial No. 160,413

11 Claims. (Cl. 318—141)

This invention relates to locomotives of a type incorporating an engine driven generator and particularly to improved means for providing dynamic braking control on these locomotives.

It has been proposed heretofore to provide locomotives of this type with dynamic braking equipment. However, the equipment heretofore proposed may operate to cause the locomotive to develop so much braking power that the couplers and draft gears on the locomotive and on the associated cars may be damaged.

An object of this invention is to provide a manually controlled electric traction and braking system for a locomotive of the type described and incorporating means acting automatically in response to the dynamic braking current generated by the traction motors to limit this current to a predetermined value and thereby limit the braking effect of the locomotive.

A further object of the invention is to provide a dynamic braking control system for a locomotive in which the field windings of the traction motors are energized from the engine driven generator, the dynamic braking control system including means responsive to the current generated by a traction motor for varying the current supplied by the generator to the motor field windings.

Another object of the invention is to provide an improved dynamic braking control system of the type described in which the value of the energy supplied from the generator to the motor field windings is varied by varying the effective energization of the generator field windings, and in which there is provided means responsive to the current generated by a traction motor for varying the effective energization of the generator field windings.

A further object of the invention is to provide an improved dynamic braking control system of the type described in which the generator is provided with a plurality of field windings, and in which during dynamic braking one of the generator field windings is employed as a differential or bucking winding and is energized in accordance with the energy generated by a traction motor.

Another object of the invention is to provide an improved dynamic braking control system of the type described which is arranged so that the braking effect may be manually varied throughout a wide range, and which incorporates means for automatically preventing the dynamic braking effect from exceeding a predetermined value regardless of operation of the manual control means.

A further object of the invention is to provide an improved dynamic braking control system of the type described which is arranged so that the equipment on the leading one of a plurality of locomotive units will govern the traction motors on the remainder of the locomotive units in such manner that the dynamic braking effect of such remaining locomotive units will be subject to manual control from the leading one of the locomotive units, and which is arranged so that, in addition, the dynamic braking effect of the traction motors on each of the remaining units will be automatically limited by the equipment on the locomotive unit with which the motors are associated.

Another object of the invention is to provide an improved dynamic braking control system of the type shown in United States Patent No. 2,304,895, issued December 15, 1942, to R. M. Dilworth et al., and in application Serial No. 132,849, filed December 14, 1949, by R. M. Dilworth, now Patent No. 2,591,791.

Other objects of the invention and features of novelty will be apparent from the following description taken in connection with the accompanying drawings in which.

Figure 1:
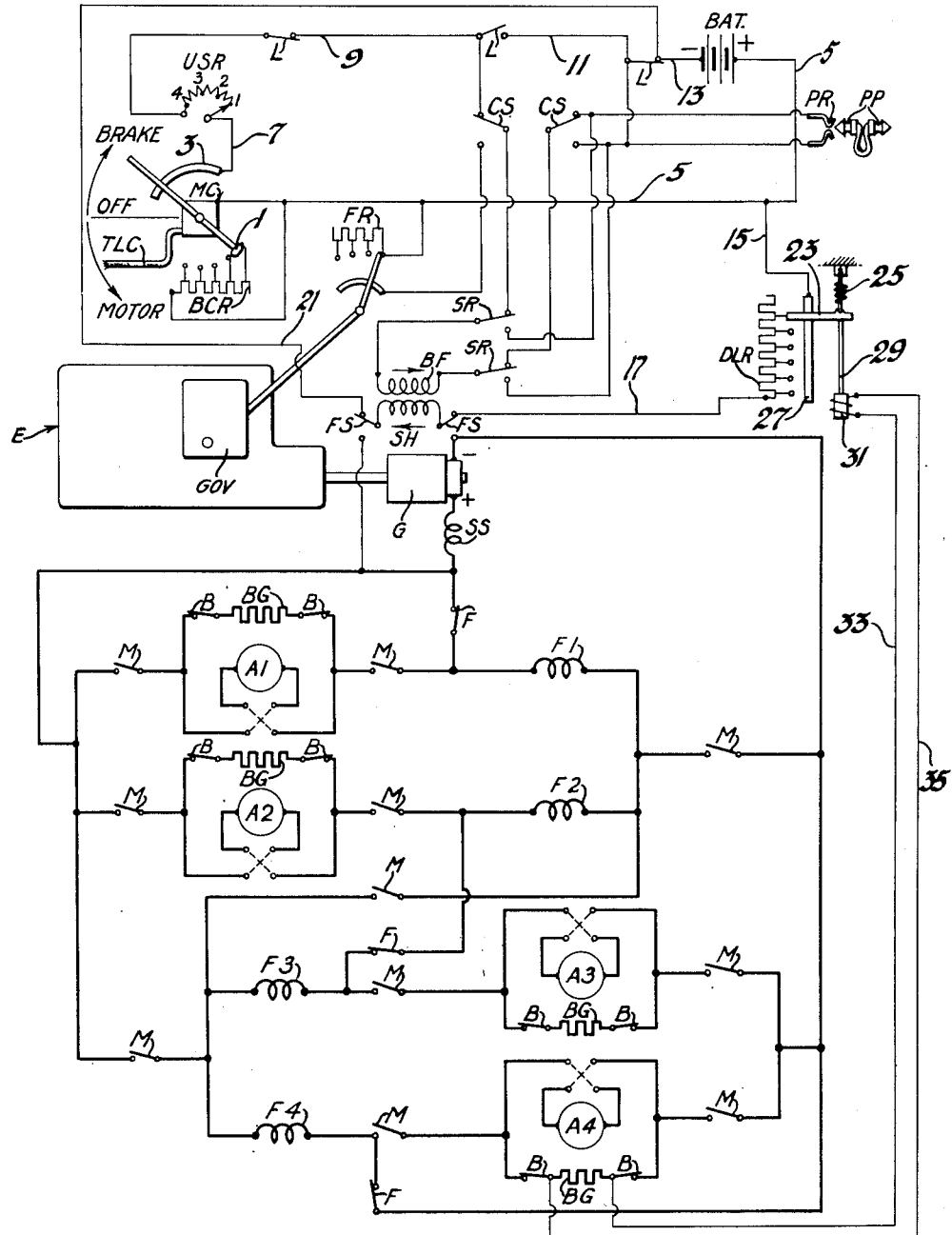
Figure 1 is a diagram showing a control system embodying my invention.

Referring to Figure 1 of the drawings, there is shown therein the equipment for one locomotive unit, but includes means for interconnection with other units of a similar type. The equipment shown includes a diesel engine E and an electric generator G driven by the engine. The equipment shown also includes four traction motors having conventional series field windings F1, F2, F3 and F4, and armatures A1, A2, A3 and A4, which are individually connected in any well known manner to separate wheels of the locomotive, not shown, to drive or be driven thereby.

Power connections in the form of relatively heavy lines are shown extending between the generator G and the traction motors. These connections are governed by contacts of switches or relays M, F and B.

The switching means M serves as motor control means and operates in conventional manner to connect the motors in series-parallel or parallel power receiving circuit relation with the generator G for driving the locomotive wheels.

The switching means B and F serve as motor braking control means and are shown arranged in the power connections so that upon simultaneous closure thereof, the motor armatures A1 to A4, inclusive, are individually connected across identical, separate braking resistors BG by contacts of the switching means B, and the series field windings F1, F2, F3 and F4 are connected in series with the generator G for separate excitation thereby. In this manner, during braking operation, the individual traction motors function as separately excited braking generators and exert retarding force on the individual locomotive wheels driving the motor armatures.

The generator G is provided with a plurality of field windings including a series field winding SS, which is connected in series with the circuit for supplying energy from the generator to the traction motors. The generator G also is provided with a battery field winding BF, which is energized in the manner hereinafter explained in detail from a battery BAT, or other source of direct current on the locomotive. In addition, the generator G is provided with a field winding SH, the circuit of which is governed by switching means FS, so that when the traction motors are driving the locomotive, the winding SH is a shunt winding and is connected across the output terminals of the generator so as to be supplied with energy of such polarity that the winding SH supplements the field windings BF and SS. When the traction motors are functioning as generators for dynamic braking purposes, the switching means FS connects the generator field winding SH to a circuit hereinafter described in detail for energizing the winding SH with current supplied from the battery BAT, and of such polarity that the winding SH bucks or opposes the field windings BF and SS.

The engine E is provided with a conventional speed governor, shown generally at GOV, for operating a field rheostat FR, and for also operating the conventional engine fuel regulating means, not shown, in a well-known manner so that the engine and generator are caused to operate at constant speed, load and power output. The governor is manually controlled by means hereinafter described so that the engine and generator may be caused to operate at any one of a plurality of predetermined values of speed, load and output. When the locomotive is employed for braking purposes, the governor GOV causes the engine to operate at idling speed.

The locomotive is provided with a master controller, indicated generally by the reference character MC, and provided with a manually operated control lever or handle which is movable in both directions from an intermediate or "off" position. The control lever is moved in a counterclockwise direction from the "off" position towards a "motor" position when the locomotive is employed for driving purposes, and is moved in the opposite or clockwise direction through a braking zone towards a "brake" position when the locomotive is employed for braking purposes. As hereinafter explained, the degree of braking effect developed by the locomotive increases in accordance with the amount of movement of the handle or lever of the master controller away from the "off" position, except that the equipment on the locomotive automatically operates to prevent the braking effect from exceeding a predetermined value.

When the handle of the master controller MC is moved towards the "motor" position, selected ones of the switches M are closed to cause the traction motors to be connected to the generator, while the governor GOV is controlled to cause the engine E to operate at the proper speed, and to adjust the rheostat FR and cause the generator output to be increased to the proper value. As long as the handle of the master controller MC is in any portion of its range of movement towards the "motor" position, the contacts of the switching means F and B are open, the movable contacts of the switching means FS are in their lower positions in which they connect the winding SH across the generator output terminals, the movable contacts of the switching means CS are in their lower positions, and the movable contacts of the switching means L and SR are in their upper positions to establish the circuit governed by rheostat FR for energizing the field winding BF.

When the handle of the master controller MC is moved towards the "brake" position, the switching means M is governed to cause all of the contacts of this switching means to be open; the switching means F and B are controlled to close their contacts; and the switching means FS, CS, L and SR are controlled so that their movable contacts are in their upper positions.

The means by which the master controller MC governs the various switching means and the governor GOV is not shown as it is not a part of this invention. However, it is contemplated that this control by the master controller MC of all of the switching means, except the switching means SR, will be effected through wires, not shown, which are included in the train line conduit TLC. The train line conduit TLC is adapted to be connected in a well-known manner with similar train line conduits on other locomotive units for multiple unit control from the master controller on the forward one of the locomotive units. Under these conditions the switching means, except the switching means SR, and the governors on all of the connected locomotive units, are simultaneously controlled to cause the equipment on all of the locomotive units to assume the same condition. The switching means SR on each locomotive unit is controlled only by the master controller on the associated locomotive unit and is independent of the master controller on connected units. Each switching means SR is controlled so that its contacts normally occupy their lower positions and are moved to their upper positions when and only when the handle of the associated master controller is moved to a position in the braking or motor zones.

The locomotive is provided with a polarized receptacle PR which has normally closed contacts but is adapted to receive a polarized plug PP on a two wire jumper by means of which connection may be established between counterpart circuits on two locomotive units. The polarized plugs and receptacles are employed to connect in series battery field windings BF of the generators G of a plurality of locomotive units so that the generators on all of the locomotive units may be controlled by the master controller on the leading locomotive unit.

The equipment on the locomotive includes a unit selector rheostat USR, which has a resistance unit divided into three sections, and has a movable member which is manually movable to one or the other of four different positions which are designated 1, 2, 3 and 4 in the drawings. The rheostat USR is at times included in series with the circuit of the battery field winding BF of the generator. The rheostat USR provides means for adjusting this circuit as required when a locomotive unit is operated alone, or when it has one, two or three similar units coupled thereto. When the rheostat movable member is in position 1, all three sections of resistance are included in the circuit, and the circuit of the battery field winding is adjusted for operation of a single locomotive unit. When the movable member of the rheostat USR is moved to position 2, two resistance sections are operative and the circuit is adjusted for operation of two locomotive units, and when the movable member is in position 3, one resistance section is operative and the circuit is adjusted for operation of three locomotive units. When the movable member is in position 4, none of the resistance sections is operative and the circuit is adjusted for operation of four locomotive units.

The equipment on each locomotive unit includes a dynamic brake limiting rheostat DLR which includes a movable contact 23 which is biased to its extreme upper position by a tension spring 25. The contact 23 is mounted on an armature 29 which is associated with a winding 31 which is connected by wires 33 and 35 in parallel with the dynamic braking resistance grid BG associated with one of the traction motors, in this case the traction motor having armature A4. The rheostat DLR is constructed so that the movable contact 23 is moved against the spring 25 a variable amount in accordance with the value of the energy supplied to the winding 31. The movable contact 23 engages an elongated stationary contact 27 and also engages separate contacts associated with the rheostat resistance element. The lower end of this resistance element has wire 17 connected thereto, and the stationary contact 27 has wire 15 connected thereto. As the movable contact 23 is normally held in its upper position the maximum amount of the rheostat resistance element is normally included in the circuit between wires 15 and 17. When the movable contact is moved downwards against the spring 25, the amount of the resistance element included in the circuit between the wires 15 and 17 is progressively reduced.

The equipment is illustrated in Figure 1 of the drawings in the condition which it assumes when a locomotive unit is being operated alone, when the handle of the master controller MC has been moved to a position in the braking zone, and the dynamic braking current generated by the traction motors is at a relatively low value so the movable contact 23 of the rheostat DLR is not moved against the spring 25.

As previously explained, when the handle of the master controller MC is moved to a position in the braking zone, the contacts of the switching means M are open and interrupt the circuits for supplying energy from the generator G to the traction motors to cause the motors to drive the locomotive. In addition, at this time the contacts of the switching means F are closed to connect the traction motor field windings in series across the generator G so that these windings are energized by current supplied from the generator and condition the traction motors to operate as generators. Also at this time, the contacts of the switching means B are closed to connect the armature of each of the traction motors across the associated braking resistance BG.

As the locomotive unit is being operated alone, the movable contact of the unit selector rheostat USR is in the position 1, and the polarized plug PP is not inserted in the polarized receptacle PR and the contacts of the receptacle PR engage each other.

As the handle of the master controller MC is in the braking zone the movable contacts of the switching means FS, CS, L and SR are in their upper positions. Accordingly, the battery field winding BF of the generator G is energized from the battery BAT over the circuit which may be traced from the positive terminal of the battery over wire 5, through the resistance unit BCR, movable contact 1, handle and stationary contact 3 of the master controller MC, wire 7, rheostat USR, a contact of switching means L, wire 9, a contact of switching means CS, a contact of switching means SR, through the generator field winding BF from left to right, a contact of switching means SR, a contact of switching means CS, contacts of the polarized receptacle PR, and a contact of switching means L to the negative terminal of the battery.

It will be seen that this circuit for energizing the generator field winding BF from the battery includes in series therewith the unit selector rheostat USR and the braking control resistance BCR.

Figure 2:
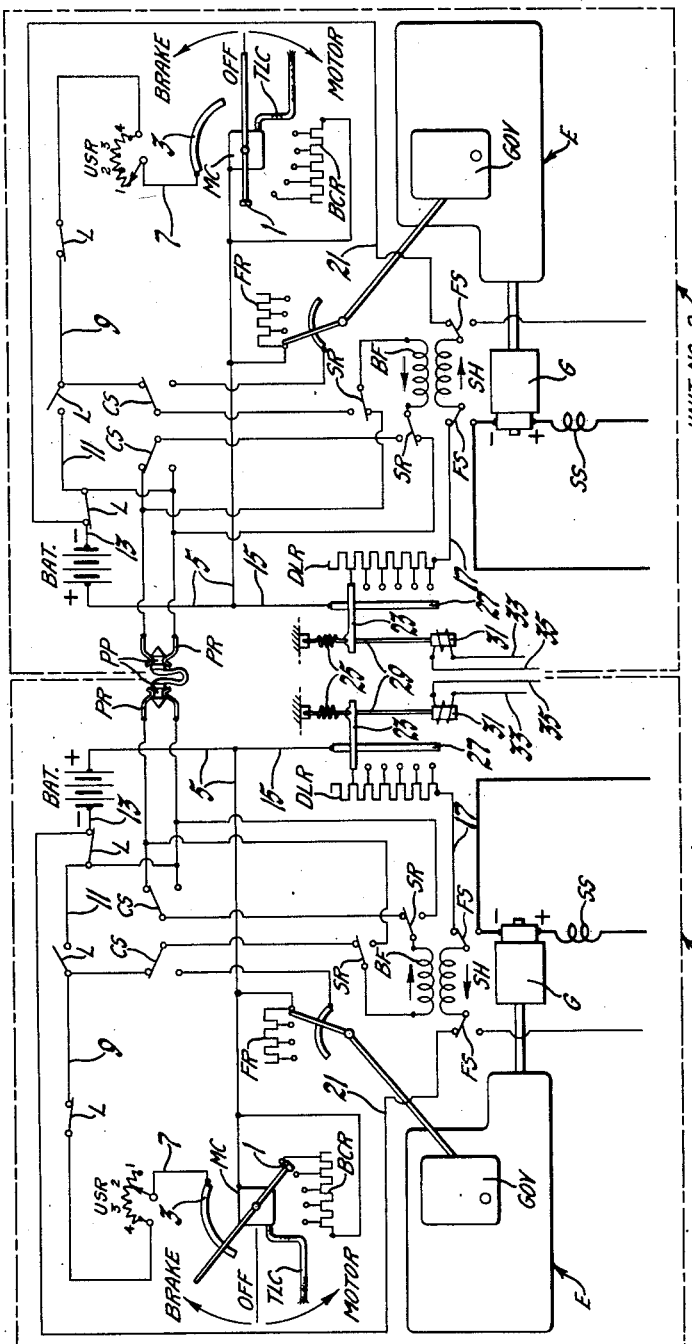
Figure 2 is a fragmentary diagram showing the control system of Figure 1 applied to a locomotive made up of two units.

The rheostat USR provides means for limiting the current in this circuit to the value which is proper when only one field winding is included in the circuit, which is the case when a locomotive unit is operated alone. As explained in detail in Patent No. 2,304,895 to R. M. Dilworth et al., and as shown in Figure 2 of the drawings of this application, when a plurality of locomotives are connected together, the battery field windings BF of the generators on the various locomotive units are connected in series, and the unit selector rheostat USR is adjusted to compensate for the increased number of windings in the circuit.

The braking control rheostat BCR is also included in the circuit of the winding BF and provides means under the control of the operator for adjustably varying the dynamic braking effect. When the handle of the master controller MC is adjacent the "off" position, all of the resistance element BCR is included in the circuit of the winding BF so relatively little energy flows through this winding and the generator G supplies relatively little current to the field windings of the traction motors. Hence, the traction motors are relatively ineffective as generators and exert relatively little retarding force on the locomotive.

At this time the generator shunt field winding SH is supplied with energy from the battery BAT over the circuit which is traced from the positive terminal of the battery over wire 5, wire 15, contacts 27 and 23 and the resistance element of rheostat DLR, wire 17, a contact of switching means FS, through the winding SH from right to left, and over a contact of the switching means FS to the negative terminal of the battery. It will be seen that the direction of flow of energy through the winding SH is opposite to that of the energy supplied to the winding BF, and it may be considered that the energy supplied to the winding SH is of reverse polarity and that the energy supplied to the winding BF is of normal polarity. Hence, the winding SH bucks or opposes the winding BF and reduces the effective field energization of the generator. However, as long as the movable member 23 of the rheostat DLR is in its upper position so that all of the resistance element of the rheostat DLR is included in series with the windings SH, so little current flows through this winding that the winding has negligible effect on the generator.

If the operator wishes to increase the dynamic braking effect, he may do so by moving the handle of the master controller MC farther towards the "brake" position, thereby reducing the amount of the resistance BCR included in the circuit of the winding BF, and correspondingly increasing energization of this winding. This increases the generator output and causes more energy to be supplied to the traction motor field windings so that the traction motors are more effective as generators and exert increased retarding force on the locomotive.

The effectiveness of the traction motors as generators is influenced not only by the degree of energization of their field windings, but is also influenced by the rate at which the motor armatures are rotated. The faster the armatures rotate the greater the current generated therein.

In order to provide braking which is adequate for relatively low speeds, the equipment must be arranged to provide energization of the motor field windings which is so great that it may be excessive for relatively high speeds. Accordingly, the control system provided by this invention has been arranged to automatically limit the possible dynamic braking effect, and to prevent the braking effect from exceeding a predetermined value irrespective of manipulation of the handle of the master controller MC. This makes it possible to secure the maximum effect from the dynamic braking means at all speeds without danger that the permissible maximum will be exceeded.

As explained above, the winding 31 of the rheostat DLR is energized in parallel with the braking resistance BG associated with one of the traction motors so that the energy supplied to the winding 31 varies in accordance with that produced by the traction motor.

The various parts of the rheostat DLR, particularly the spring 25, the armature 29, and the winding 31 are selected and proportioned so that as long as the energy supplied to the winding 31 is below a predetermined safe value, the armature 29 will not be moved against the spring 25. Hence, so long as the energy generated by a traction motor remains below a safe value, the movable contact 23 of the rheostat DLR is maintained in the position in which it causes all of the resistance element of the rheostat DLR to be included in the circuit of the winding SH and the winding SH has little effect on the generator.

If operating conditions are such that the energy generated by a traction motor approaches the safe predetermined maximum value, indicating that the maximum retarding force which may be exerted by the traction motors is being approached, sufficient energy will be supplied to the winding 31 of the rheostat DLR to move the armature 29 against the spring 25. On the movement of the armature 29, the movable contact 23 is moved to decrease the amount of the resistance element of the rheostat DLR which is included in the circuit of the generator field winding SH. Accordingly, there is an increase in the flow of energy in the winding SH and the winding SH has increased effect in opposing the battery field winding BF of the generator and there is a reduction in the effective energization of the generator field. As a result of this reduction in the effective energization of the generator field there is a reduction in the generator output and a corresponding reduction in the degree of energization of the traction motor field windings. Hence, the effectiveness of the traction motors as generators is reduced and they exert less retarding force on the locomotive, and at the same time there is a reduction in the value of the current supplied to the winding 31 of the rheostat DLR. As a result the armature 29 of the rheostat DLR tends to be moved upwardly by the spring 25 to move the contact 23 upwardly and increase the resistance in the circuit of the winding SH.

In this manner the rheostat DLR serves to prevent the dynamic braking effect from exceeding the predetermined safe maximum, but at the same time permits this maximum safe value of braking effect to be obtained at all times.

When the handle of the master controller MC is moved to the "off" position, the movable contact 1 is moved out of engagement with the stationary contacts associated with the resistance BCR, and the handle is moved out of engagement with the arcuate contact 3 so the circuit for supplying energy to the winding BF is interrupted. In addition, on movement of the handle of the master controller MC to the "off" position the movable contacts of the switching means FS move to their lower positions to interrupt the circuit governed by rheostat DLR for energizing the winding SH from the battery BAT. At this time contacts of the switching means FS connect the winding SH across the generator output terminals so the winding again functions as a shunt winding. Also, when the handle of the master controller MC is moved to the "off" position, the contacts of the switching means F open and interrupt the circuit of the traction motor field windings so the traction motors cease to function as generators and cease to exert retarding force on the locomotive.

As soon as the winding BF of the generator G is de-energized, the generator ceases to generate current so the equipment is in an inactive condition until the operator moves the handle of the master controller MC away from the intermediate or "off" position.

As explained above, when a plurality of locomotive units are coupled together the switching means on all of the units are governed by the master controller MC on the leading unit in the same manner that the switching means on the leading unit are controlled, except that on all of the locomotive units except the leading one of the units, the movable contacts of the switching means SR remain in their lower or released positions at all times. On the leading unit the movable contacts of the switch means SR are picked up when the handle of the master controller MC is in the braking zone. In addition, as explained above, when the handle of the master controller MC on the leading unit of a plurality of locomotive units is moved to a position in the braking zone, the switching means FS, CS, and L on that locomotive unit move to their upper positions. Since the counterpart switching means FS, CS, and L on all of the coupled locomotive units are similarly controlled, it follows that the movable contacts of these switching means on locomotive units other than the leading unit are also picked up, but that the movable contacts of switching means SR on a locomotive unit other than the leading unit are released. This is clearly shown in Figure 2 which is a diagram illustrating the equipment on two connected locomotive units.

Referring to Figure 2 of the drawings, there is shown therein a portion of the equipment on two locomotive units, these units being designated Unit No. 1, and Unit No. 2. Unit No. 1 is at the left and it will be assumed that this unit is the leading unit and that both units are controlled by the master controller on this unit.

As two units are being operated together, the movable member of the unit selector rheostat USR on the forward locomotive, Unit No. 1, is moved to the position 2 to connect the proper amount of the resistance element of this rheostat in the circuit of the battery field windings BF of the generators G of the two locomotive units.

As shown the handle of the master controller MC on the forward locomotive Unit No. 1 is moved to a position in the braking zone. Under these conditions the battery field windings BF of the generators G on both locomotive units are energized in series with current supplied from the battery BAT on the forward unit. The circuit for supplying energy to these windings is traced from the positive terminal of the battery BAT on the locomotive Unit No. 1, over wire 5 on Unit No. 1, through the resistance element BCR, contact 1, handle and contact 3 of the master controller MC, unit selector rheostat USR, a contact of switching means L, a contact of switching means CS, a movable contact of switching means SR closed in its upper position, winding BF from left to right, a movable contact of switching means SR closed in its upper position, a movable contact of switching means CS closed in its upper position to a wire leading to the upper one of the contacts of the polarized receptacle PR, through the jumper to the wire leading from the upper contact of the polarized receptacle PR on locomotive Unit No. 2, over a movable contact of switching means SR closed in its lower position, through the winding BF of the generator G on locomotive Unit No. 2 from right to left, over a movable contact of switching means SR closed in its lower position, through the lower contacts of the polarized receptacles PR, and over a contact L of the switching means on locomotive Unit No. 1 to the negative terminal of the battery on this unit.

Accordingly the battery field windings BF of the generators G on both locomotive units are energized in series from the battery BAT on the forward locomotive unit over a circuit which includes the brake control resistor BCR on the forward locomotive unit. Hence, the energization of the windings BF on both locomotive units is responsive to movement of the handle of the master controller MC on the forward locomotive unit and movement of this handle regulates the degree of brake application on both locomotive units.

When the handle of the master controller MC on the forward locomotive unit is moved to a position in the braking zone, a circuit is established for the generator winding SH on each locomotive unit to energize the winding with current of reverse polarity from the battery on the same locomotive unit. The circuit for supplying energy to each winding SH is governed by the rheostat DLR on the same locomotive unit. The circuits for supplying energy to the windings SH on the locomotive units are substantially identical and each is traced from the positive terminal of the associated battery, through the associated rheostat DLR, over a contact of the switching means FS, through the winding SH and over another contact of the switching means FS to the negative terminal of the battery. On the locomotive Unit No. 1 the energy flows through the winding SH from right to left, and on the locomotive Unit No. 2 the energy flows through the winding SH from left to right. However, in each case the direction of flow of energy through the winding SH is opposite to the direction of flow of energy through the associated winding BF so the energy supplied to each winding SH may be considered to be of reverse polarity. The energy supplied to each winding SH reduces the effective energization of the field of the generator with which the winding is associated and thereby reduces the current supplied from the generator to the field windings of the traction motors on the locomotive unit.

As explained in detail in connection with Figure 1 of the drawings each rheostat DLR has a winding 31 which is energized in accordance with the energy supplied from a traction motor of the associated locomotive unit. Hence, each rheostat DLR operates to increase energization of a winding SH if the current supplied by a traction motor approaches the predetermined maximum. Accordingly, the equipment on each locomotive unit operates automatically to limit the dynamic braking effect of the locomotive unit to the predetermined maximum irrespective of operation of the handle of the master controller MC on the leading locomotive unit. The operation of the equipment is such, therefore, that the degree of dynamic braking on both of the locomotive units is subject to the control of the operator on the leading locomotive unit and may be varied as desired by this operator, except that the equipment on each locomotive unit prevents the dynamic braking effect on that locomotive unit from exceeding the desired maximum.

Although only two locomotive units are illustrated in Figure 2 it should be understood that a larger number of units may be coupled together and that the equipment will then operate in substantially the same manner as explained above.

Although I have illustrated and described one form of dynamic braking control means embodying my invention, it should be understood that the invention is not limited to those details of construction and that numerous changes and modifications may be made without departing from the spirit and scope of the following claims.

I claim:

1. In combination, a locomotive having thereon an engine driven generator provided with at least a first and a second field winding, a traction motor having a field winding and an armature, said armature being connected with a wheel of said locomotive so as to at times drive said wheel and at other times be driven thereby, switching means for at times connecting the motor armature and field winding in series with the generator to cause the motor to drive the locomotive, a brake control member manually movable between an off position and a braking position, means effective when said brake control member is in said braking position to supply energy of normal polarity to said generator first field winding, switching means effective when said control member is in said braking position to connect said traction motor field winding to receive energy from said generator and to connect said traction motor armature to supply energy to a braking resistor, other switching means effective when said motor is driving said locomotive to connect said generator second field winding across the generator output terminals so as to be supplied with energy of said normal polarity, said other switching means being effective when said brake control member is in said braking position to connect said generator second field winding to a circuit over which there is supplied energy of reverse polarity, and means responsive to energy supplied from said motor armature to said braking resistor for controlling the energy supplied over said last named circuit.

2. In combination, a locomotive having thereon an engine driven generator provided with at least a first and a second field winding, a traction motor having a field winding and an armature, said armature being connected with a wheel of said locomotive so as to at times drive said wheel and at other times be driven thereby, switching means for at times connecting the motor armature and field winding in series with the generator to cause the motor to drive the locomotive, a brake control member manually movable between an off position and a braking position, means effective when said brake control member is in said braking position to supply energy of normal polarity to said generator first field winding, switching means effective when said control member is in said braking position to connect said traction motor field winding to receive energy from said generator and to connect said traction motor armature to supply energy to a braking resistor, other switching means effective when said motor is driving said locomotive to connect said generator second field winding across the generator output terminals so as to be supplied with energy of said normal polarity, said other switching means being effective when said brake control member is in said braking position to connect said generator second field winding to a circuit over which there is supplied energy of reverse polarity, and means for varying the current supplied over said last named circuit in accordance with the value of the current supplied from said motor armature to said resistor.

3. In combination, a locomotive having thereon an engine driven generator provided with at least a first and a second field winding, a traction motor having a field winding and an armature, said armature being connected with a wheel of said locomotive so as to at times drive said wheel and at other times be driven thereby, switching means for at times connecting the motor armature and field winding in series with the generator to cause the motor to drive the locomotive, a brake control member manually movable between an off position and a braking position, means effective when said brake control member is in said braking position to supply energy of normal polarity to said generator first field winding, switching means effective when said control member is in said braking position to connect said traction motor field winding to receive energy from said generator and to connect said traction motor armature to supply energy to a braking resistor, other switching means effective when said motor is driving said locomotive to connect said generator second field winding across the generator output terminals so as to be supplied with energy of said normal polarity, said other switching means being effective when said brake control member is in said braking position to connect said generator second field winding to a circuit over which there is supplied energy of reverse polarity, a limiting resistance in said last named circuit, and means effective on a predetermined increase in the value of the current supplied from said motor armature to said braking resistor to reduce the value of said limiting resistance.

4. In combination, a locomotive having thereon an engine driven generator provided with at least a first and a second field winding, a traction motor having a field winding and an armature, said armature being connected with a wheel of said locomotive so as to at times drive said wheel and at other times be driven thereby, switching means for at times connecting the motor armature and field winding in series with the generator to cause the motor to drive the locomotive, a brake control member manually movable from an off position through a braking zone, means effective when said control member is in said braking zone to supply to said generator first field winding energy of normal polarity and of a value which increases in accordance with the amount of movement of said control member away from said off position, switching means effective when said control member is in said braking zone to connect said traction motor field winding to receive energy from said generator and to connect said traction motor armature to supply energy to a braking resistor, other switching means effective when said motor is driving said locomotive to connect said generator second field winding across the generator output terminals so as to be supplied with energy of said normal polarity, said other switching means being effective when said brake control member is in said braking zone to connect said generator second field winding to a circuit over which there is supplied energy of reverse polarity, and means responsive to energy supplied from said motor armature to said braking resistor for controlling the energy supplied over said last named circuit.

5. In combination, a locomotive having thereon an engine driven generator provided with at least a first and a second field winding, a traction motor having a field winding and an armature, said armature being connected with a wheel of said locomotive so as to at times drive said wheel and at other times be driven thereby, switching means for at times connecting the motor armature and field winding in series with the generator to cause the motor to drive the locomotive, a brake control member manually movable from an off position through a braking zone, means effective when said control member is in said braking zone to supply to said generator first field winding energy of normal polarity and of a value which increases in accordance with the amount of movement of said control member away from said off position, switching means effective when said control member is in said braking zone to connect said traction motor field winding to receive energy from said generator and to connect said traction motor armature to supply energy to a braking resistor, other switching means effective when said motor is driving said locomotive to connect said generator second field winding across the generator output terminals so as to be supplied with energy of said normal polarity, said other switching means being effective when said brake control member is in said braking zone to connect said generator second field winding to a circuit over which there is supplied energy of reverse polarity, and means for varying the current supplied over said last named circuit to said generator second field winding in accordance with the value of the current supplied from said motor armature to said braking resistor.

6. In a multi-unit locomotive, each of said units having thereon an engine driven generator provided with at least a first and a second field winding, each of said units having a traction motor having a field winding and an armature, each of said motor armatures being connected with a wheel of the associated unit so as to at times drive said wheel and at other times be driven thereby, switching means on each unit for at times connecting the associated motor armature and field winding in series with the associated generator to cause the motor to drive the associated locomotive unit, at least one of said locomotive units having thereon a brake control member manually movable between an off and a braking position, means effective when said brake control member is in said braking position to supply energy of normal polarity to the first field windings of the generators on all of the locomotive units, switching means on each unit governed by the brake control member on said one unit and effective when said control member is in the braking position to connect the field winding of the traction motor on the unit with which the switching means is associated to receive energy from the associated generator and to connect the armature of the associated traction motor to supply energy to a braking resistor, other switching means on each unit governed by the brake control member on said one unit and effective when said member is in the braking position to connect the second field winding of the generator on the unit with which the switching means is associated to a circuit over which there is supplied energy of reverse polarity, and means on each unit responsive to the current supplied from the armature of the motor associated with said unit to the associated braking resistor for controlling the supply of energy of reverse polarity to the second field winding of the associated generator.

7. In a multi-unit locomotive, each of said units having thereon an engine driven generator provided with at least a first and a second field winding, each of said units having a traction motor having a field winding and an armature, each of said motor armatures being connected with a wheel of the associated unit so as to at times drive said wheel and at other times be driven thereby, switching means on each unit for at times connecting the associated motor armature and field winding in series with the associated generator to cause the motor to drive the associated locomotive unit, at least one of said locomotive units having thereon a brake control member manually movable between an off and a braking position, means effective when said brake control member is in said braking position to supply energy of normal polarity to the first field windings of the generators on all of the locomotive units, switching means on each unit governed by the brake control member on said one unit and effective when said control member is in the braking position to connect the field winding of the traction motor on the unit with which the switching means is associated to receive energy from the associated generator and to connect the armature of the associated traction motor to supply energy to a braking resistor, other switching means on each unit governed by the brake control member on said one unit and effective when said member is in the braking position to connect the second field winding of the generator on the unit with which the switching means is associated to a circuit over which there is supplied energy of reverse polarity, and means on each unit effective on a predetermined increase in the current supplied from the armature of the motor associated with said unit to the associated braking resistor for increasing the value of the energy of reverse polarity supplied to the second field winding of the associated generator.

8. In a multi-unit locomotive, each of said units having thereon an engine driven generator provided with at least a first and a second field winding, each of said units having a traction motor having a field winding and an armature, each of said motor armatures being connected with a wheel of the associated unit so as to at times drive said wheel and at other times be driven thereby, switching means on each unit for at times connecting the associated motor armature and field winding in series with the associated generator to cause the motor to drive the associated locomotive unit, at least one of said locomotive units having thereon a brake control member manually movable from an off position through a braking zone, means effective when said brake control member is in said braking zone to supply to the first field windings of the generators on all of the locomotive units energy of normal polarity and of a value which increases in accordance with the amount of movement of said control member away from said off position, switching means on each unit governed by the brake control member on said one unit and effective when said control member is in the braking zone to connect the field winding of the traction motor on the unit with which the switching means is associated to receive energy from the associated generator and to connect the armature of the associated traction motor to supply energy to a braking resistor, other switching means on each unit governed by the brake control member on said one unit and effective when said member is in the braking zone to connect the second field winding of the generator on the unit with which the switching means is associated to a circuit over which there is supplied energy of reverse polarity, and means on each unit for limiting the dynamic braking effort developed by said unit, each such means comprising means on each unit responsive to the current supplied from the armature of the motor associated with said unit to the associated braking resistor for controlling the value of the current of reverse polarity supplied to the second field winding of the associated generator.

9. In a multi-unit locomotive, each of said units having thereon an engine driven generator provided with field winding means, each of said units having a traction motor having a field winding and an armature, each of said motor armatures being connected with a wheel of the associated unit so as to at times drive said wheel and at other times to be driven thereby, switching means on each unit for at times connecting the associated motor armature and field winding in series with the associated generator to cause the motor to drive the associated locomotive unit, at least one of said locomotive units having thereon a brake control member manually movable between an off and a braking position, means effective when said brake control member is in said braking position to supply energy to the field winding means of the generators on all of the locomotive units, switching means on each unit governed by the brake control member on said one unit and effective when said control member is in the braking position to connect the field winding of the traction motor on the unit with which the switching means is associated to receive energy from the associated generator and to connect the armature of the associated traction motor to supply energy to a braking resistor, regulating means on each unit responsive to the current supplied from the armature of the motor associated with said unit to the associated braking resistor for controlling the degree of energization of the field winding means of the associated generator, and other switching means on each unit governed by the brake control member on said one unit and operative when said brake control member is in the braking position to render effective the associated regulating means.

10. In combination, a locomotive having thereon an engine driven generator provided with at least a first and a second field winding, a traction motor having a field winding and an armature, said armature being connected with a wheel of said locomotive so as to at times be driven thereby, switching means for at times connecting the motor armature and field winding with the generator to cause the motor to drive the locomotive, a brake control member movable between an off position and a braking position, means effective when said brake control member is in said braking position to supply energy of normal polarity to said generator first field winding, switching means effective when said control member is in said braking position to connect said traction motor field winding to receive energy from said generator, and to connect said traction motor armature to supply energy to a braking resistor, other switching means effective when said motor is driving said locomotive to connect said generator second field winding across the generator output terminals so as to be supplied with energy of said normal polarity, said other switching means being effective when said brake control member is in said braking position to connect said generator second field winding to a circuit over which there is supplied energy of reverse polarity, and means responsive to energy supplied from said motor armature to said braking resistor for controlling the energy supplied over said last named circuit.

11. In combination, a locomotive having thereon an engine driven generator provided with at least a first and a second field winding, a traction motor having a field winding and an armature, said armature being connected with a wheel of said locomotive so as to at times be driven thereby, switching means for at times connecting the motor armature and field winding with the generator to cause the motor to drive the locomotive, a brake control member movable between an off position and a braking position, means effective when said brake control member is in said braking position to supply energy of normal polarity to said generator first field winding, switching means effective when said control member is in said braking position to connect said traction motor field winding to receive energy from said generator and to connect said traction motor armature to supply energy to a braking resistor, other switching means effective when said motor is driving said locomotive to connect said generator second field winding across the generator output terminals so as to be supplied with energy of said normal polarity, said other switching means being effective when said brake control member is in said braking position to connect said generator second field winding to a circuit over which there is supplied energy of reverse polarity, and means for varying the current supplied over said last named circuit in accordance with the value of the current supplied from said motor armature to said resistor.

TORSTEN O. LILLQUIST.

REFERENCES CITED

The following references are of record in the file of this patent:

UNITED STATES PATENTS

| Number | Name | Date |
|---|---|---|
| 2,304,895 | Dilworth et al. | Dec. 15, 1942 |
| 2,445,460 | Snyder | July 20, 1948 |

FOREIGN PATENTS

| Number | Country | Date |
|---|---|---|
| 766,539 | France | Apr. 16, 1934 |